(12) United States Patent
Wakano

(10) Patent No.: US 9,124,341 B1
(45) Date of Patent: Sep. 1, 2015

(54) NOTIFICATION DEVICE FOR PACKAGE DELIVERY

(76) Inventor: Glenn Hideo Wakano, Los Angeles, CA (US)

( * ) Notice: Subject to any disclaimer, the term of this patent is extended or adjusted under 35 U.S.C. 154(b) by 3 days.

(21) Appl. No.: 13/605,180

(22) Filed: Sep. 6, 2012

Related U.S. Application Data

(60) Provisional application No. 61/531,901, filed on Sep. 7, 2011.

(51) Int. Cl.
*H04B 1/38* (2015.01)
*H04M 11/00* (2006.01)
*H04B 7/185* (2006.01)

(52) U.S. Cl.
CPC ...................... *H04B 7/185* (2013.01)

(58) Field of Classification Search
CPC ......... H04B 7/185; H04B 1/38; H04M 11/00; H04Q 7/20
USPC .................. 455/12.1, 90.1, 90.2, 90.3, 575.1, 455/575.2, 575.3, 575.4, 575.5, 575.6, 455/575.7, 575.8; 709/204
See application file for complete search history.

(56) References Cited

U.S. PATENT DOCUMENTS

| 5,648,770 A * | 7/1997 | Ross ............................ 340/994 |
| 2003/0114206 A1 * | 6/2003 | Timothy et al. ............... 455/575 |
| 2008/0061966 A1 * | 3/2008 | Nelson ..................... 340/539.23 |
| 2008/0133659 A1 * | 6/2008 | Aldrey et al. ................. 709/204 |
| 2009/0036149 A1 * | 2/2009 | Liu et al. ....................... 455/466 |

* cited by examiner

*Primary Examiner* — Myron K Wyche
(74) *Attorney, Agent, or Firm* — Plager Schack LLP

(57) ABSTRACT

A notification device for sending a predetermined message regarding the delivery of a package to a recipient contact number is disclosed. The device may be programmed with one or more recipient contact numbers. When delivery of the package is imminent, a delivery driver or other operator may send a first message to the recipient contact number. When the driver arrives at the delivery address, the operator may send a second message to the recipient contact number.

12 Claims, 1 Drawing Sheet

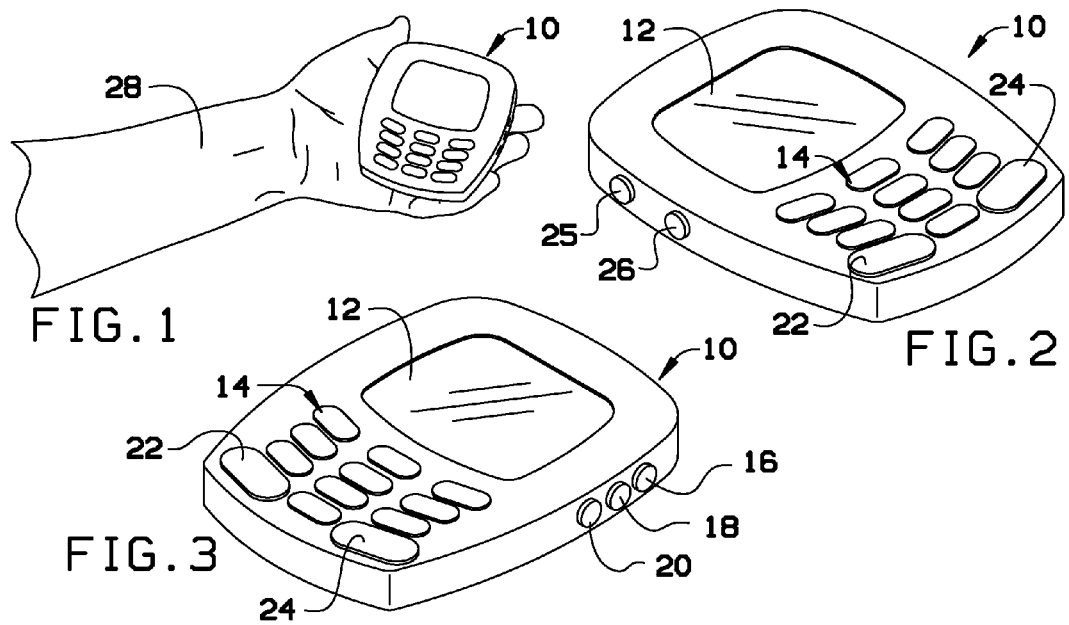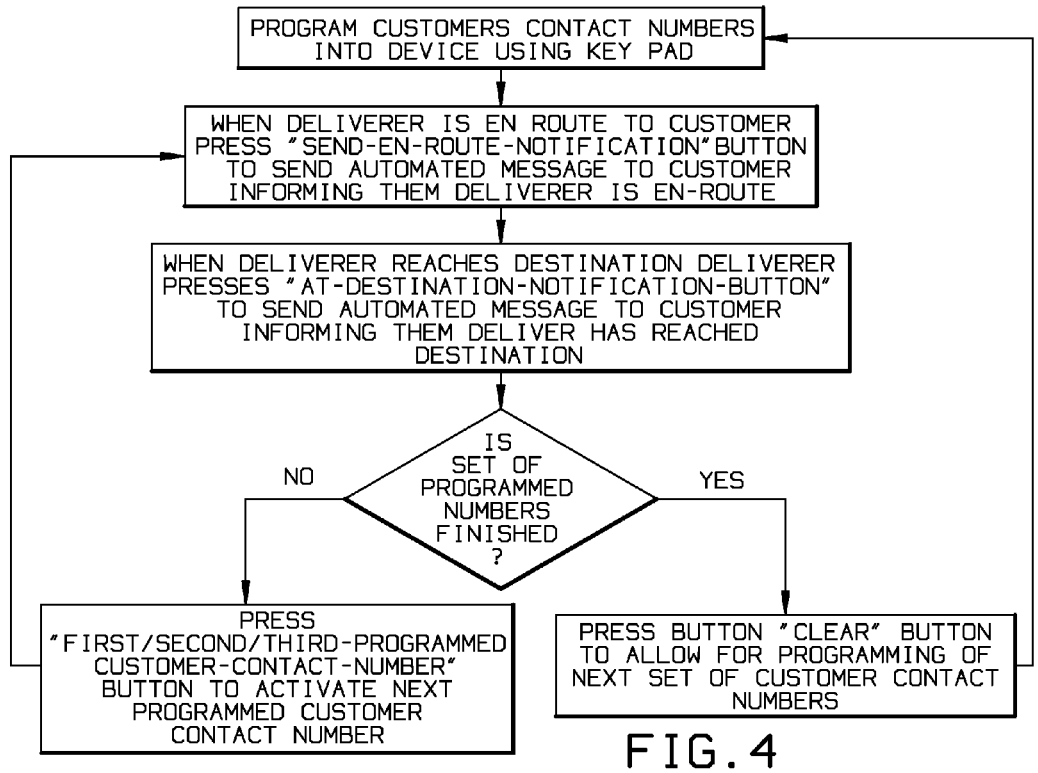

NOTIFICATION DEVICE FOR PACKAGE DELIVERY

CROSS-REFERENCE TO RELATED APPLICATIONS

This application claims priority under 35 U.S.C. §119(e) to provisional U.S. Patent Application No. 61/531,901, filed on Sep. 7, 2011, the disclosure of which is expressly incorporated by reference herein in its entirety.

BACKGROUND OF THE PRESENT DISCLOSURE

1. Field of the Present Disclosure

The present disclosure is directed to a device and method for notifying a recipient of an imminent delivery of a package.

2. Related Art

With the rise of online shopping, many people frequently and eagerly await the arrival of a package. Current tracking systems can update a recipient as a package moves across the state or country, or notify a recipient on the day the package is to be delivered. However, current systems are poor at notifying a recipient when delivery is imminent (e.g. within the next 20 minutes) or when the delivery van or truck has arrived at the delivery address. For example, current systems may rely on the delivery driver to notify a dispatch operator or automated system of his whereabouts and schedule. The dispatcher may then be responsible for updating one or more notification systems. The driver may make his updates only periodically, instead of real-time, or at the end of his route. Thus, the recipient often receives a delivery notification long after the package is delivered, which provides little to no value to the customer.

SUMMARY OF THE PRESENT DISCLOSURE

The present disclosure meets the foregoing need and allows a driver to send one or more notifications directly to a recipient, which results in a significant value to the customer and other advantages apparent from the discussion herein.

According to one aspect of the present disclosure, a notification device includes a programmable memory, a keypad, three selection buttons, and two notification buttons. The keypad is configured to enter at least one recipient contact number, which is stored in the programmable memory. The three selection buttons are configured to select a recipient contact number that is stored in the programmable memory. The first notification button is configured to cause a first predetermined message to be sent to the selected recipient contact number. The second notification button is configured to cause a second predetermined message to be sent to the selected recipient contact number.

According to another aspect of the present disclosure, a method for transmitting a predetermined message from a notification device to a recipient contact number includes programming at least one recipient contact number into a notification device using a keypad. The method also includes selecting at least one recipient contact number from the notification device using at least one selection button. The method further includes transmitting a first predetermined message to the selected recipient contact number by pressing a first notification button. The method additionally includes transmitting a second predetermined message to the selected recipient contact number by pressing a second notification button.

Additional features, advantages, and aspects of the present disclosure may be set forth or apparent from consideration of the following detailed description, drawings, and claims. Moreover, it is to be understood that both the foregoing summary of the present disclosure and the following detailed description are exemplary and intended to provide further explanation without limiting the scope of the present disclosure as claimed.

BRIEF DESCRIPTION OF THE DRAWINGS

The accompanying drawings, which are included to provide a further understanding of the present disclosure, are incorporated in and constitute a part of this specification, illustrate aspects of the present disclosure and together with the detailed description serve to explain the principles of the present disclosure. No attempt is made to show structural details of the present disclosure in more detail than may be necessary for a fundamental understanding of the present disclosure and the various ways in which it may be practiced. In the drawings:

FIG. 1 is a perspective detail view of a notification device, according to an aspect of the present disclosure, shown in use;

FIG. 2 is a left side perspective view of the notification device of FIG. 1;

FIG. 3 is a right side perspective view of the notification device of FIG. 1; and FIG. 4 is a schematic flow diagram, according to an aspect of the present disclosure.

DETAILED DESCRIPTION OF THE PRESENT DISCLOSURE

The aspects of the present disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the present disclosure. The examples used herein are intended merely to facilitate an understanding of ways in which the present disclosure may be practiced and to further enable those of skill in the art to practice the aspects of the present disclosure. Accordingly, the examples and aspects herein should not be construed as limiting the scope of the present disclosure, which is defined solely by the appended claims and applicable law. Moreover, it is noted that like reference numerals represent similar parts throughout the several views of the drawings.

According to an aspect of the present disclosure, a notification device 10 may be provided to a delivery driver or other operator 28. The notification device 10 may include a display screen 12; a keypad 14; one or more selection buttons 16, 18, 20; and one or more notification buttons 25, 26. An exemplary device 10 may be seen, e.g., in FIGS. 1-3. While this exemplary device 10 may be shown with three selection buttons 16, 18, 20, a device 10 may incorporate more or fewer selection buttons without departing from the spirit and scope of the present disclosure. Similarly, while the device 10 may be shown with two notification buttons 25, 26, a device 10 may incorporate more or fewer notification buttons without departing from the spirit and scope of the present disclosure. For example, the number and placement of selection and notification buttons may be altered to suit a particular application or method of operation, as will be appreciate by one having ordinary skill in the art. The keypad 14 may include a clear or erase button 22 and an on/off button 24.

FIG. 4 is a schematic flow diagram, according to an aspect of the present disclosure. The operator 28, may program a recipient contact number into the memory of the device 10 using the keypad 14. Recipient contact numbers may also be added to the device 10 through other means. For example, the device 10 may be capable of receiving data from a computer system or other device via, e.g., Bluetooth®, Wi-Fi®, near-field communications (NFC), or a wired connection. The device may also incorporate a scanner for scanning barcodes, QR codes, and the like; the scanner may be used to add recipient contact numbers to the device, possibly by directly scanning packages to be delivered.

The recipient contact number may be a phone number, including without limitation a mobile phone number, a home phone number, or a work phone number; an email address; or any other electronic address that may be used to contact the recipient of a package. Once the first contact number is entered, the operator 28 may continue to enter contact numbers for additional customers. According to one aspect of the present disclosure, the notification device 10 may be programmed with three contact numbers, and each of these contact numbers may be associated with one of the selection buttons 16, 18, 20. Alternatively, the device 10 may be programmed with more or fewer contact numbers, up to the limit of a programmable memory unit in the device 10. According to an additional aspect of the present disclosure, the selection buttons 16, 18, 20 may be used to scroll through the contact numbers and select one. In addition to storing a customer contact number, the programmable memory may also store an indication of the type of number that is stored, e.g. if the number is capable of receiving SMS messages, email messages, or voice messages.

Once a recipient contact number has been selected, the operator 28 may send a first predetermined message to the recipient by pressing a notification button 25. For example, the predetermined message may be a message indicating that delivery of a package to the recipient is imminent and may be expected with, e.g., 20 minutes. If the recipient contact number is a number (or email address) that can receive a text message, the device 10 may send a text message to the recipient, such as, e.g., via SMS, email, POP/SMTP. If the recipient contact number is a number that can receive voice messages, the device may transmit a voice message to the recipient via a cellular or mobile phone network.

Once the driver or operator 28 arrives at the recipient's address, the operator 28 may transmit a second predetermined message to the recipient by pressing a notification button 26. For example, the second predetermined message may indicate that the driver has arrived at the delivery address. As with the first predetermined message, discussed above, the second predetermined message may contain text or voice and may be sent using an appropriate protocol and/or network.

When the delivery is complete, the recipient's contact number may be removed from the device 10, e.g., by pressing the clear button 22. If additional recipient contact numbers remain in the device 10, the operator 28 may select the next recipient contact number from the device 10, according to, e.g., the driver's schedule or route, and transmit the first predetermined message to the next recipient. If there are no remaining recipient contact numbers, then the operator 28 may enter more contact numbers as described above.

According to an additional aspect of the present disclosure, the functionality of the device 10 can be incorporated into or combined with other devices without departing from the spirit and scope of the present disclosure. For example, a delivery driver may carry a digital tablet or computer for recording delivery times, delivery locations, recipient signatures, and so on. This digital tablet could incorporate functionality for sending predetermined messages to a recipient contact number. Instead of being dedicated function keys, selection buttons 16, 18, 20 and notification buttons 25, 26 could be replaced with or integrated into multifunction buttons, menus, or other aspects of a user interface. The keypad 14 and screen 12 may also be replaced or integrated into the second device.

According to yet another aspect of the present disclosure, the notification device 10 may be combined with existing global positioning system (GPS) technology. For example, a device 10 with GPS could automatically send a notification when the delivery vehicle arrives at a particular address or other location, such as, e.g., a waypoint marked or selected on a delivery route map.

While the present disclosure has been described in terms of exemplary aspects, those skilled in the art will recognize that the present disclosure can be practiced with modifications in the spirit and scope of the appended claims. These examples given above are merely illustrative and are not meant to be an exhaustive list of all possible designs, aspects, applications or modifications of the present disclosure.

What is claimed is:

1. A non-transitory computer readable medium storing a program which, when executed by at least one processing unit of a portable notification computing device, uses predetermined delivery status messages to inform a recipient of a pending delivery, said program comprising sets of instructions for:

receiving a plurality of numbers that corresponds to a plurality of key inputs on a keypad of the portable notification computing device;

creating a contact number from the plurality of numbers, said contact number associated with the recipient of the pending delivery;

setting a correspondence between the contact number and a particular hardware notification button of a plurality of hardware notification buttons of the portable notification computing device;

determining that the particular hardware notification button is being depressed on the portable notification computing device;

retrieving the contact number that is associated with the recipient of the pending delivery and that corresponds to the particular hardware notification button;

transmitting a first predetermined delivery status message to the contact number associated with the recipient of the pending delivery and that corresponds to the particular hardware notification button, said first predetermined delivery status message comprising a notification that the pending delivery is en route to a delivery location associated with the recipient; and transmitting a second predetermined delivery status message to the contact number associated with the recipient of the pending delivery and that corresponds to the particular hardware notification button, said second predetermined delivery status message comprising a notification that the pending delivery is at the delivery location associated with the recipient, wherein the second predetermined delivery status message is transmitted to the same contact number as the contact number to which the first predetermined delivery status message is transmitted.

2. The non-transitory computer readable medium of claim 1, wherein the particular hardware notification button is a first hardware notification button corresponding to a first contact number associated with the recipient.

3. The non-transitory computer readable medium of claim 1, wherein the particular hardware notification button is a second hardware notification button corresponding to a second contact number associated with the recipient.

4. The non-transitory computer readable medium of claim 1, wherein the particular hardware notification button is a first hardware notification button corresponding to the contact number associated with the recipient, wherein the pending delivery is a first pending delivery and the recipient is a first recipient, wherein said program further comprises sets of instructions for:
- receiving a second plurality of numbers that corresponds to a second plurality of key inputs on the keypad of the portable notification computing device;
- creating a second contact number from the second plurality of numbers, said second contact number associated with a second recipient of a second pending delivery, wherein the second recipient is different from the first recipient and the second pending delivery is different from the first pending delivery;
- setting a correspondence between the second contact number and a second hardware notification button of a plurality of hardware notification buttons of the portable notification computing device, wherein the second hardware notification button is different from the particular hardware notification button;
- determining that the second hardware notification button is being depressed on the portable notification computing device;
- retrieving the second contact number that is associated with the second recipient of the second pending delivery and that corresponds to the second hardware notification button;
- transmitting a third predetermined delivery status message to the second contact number associated with the second recipient of the second pending delivery and that corresponds to the second hardware notification button, said third predetermined delivery status message comprising a notification that the second pending delivery is en route to a second delivery location associated with the second recipient; and
- transmitting a fourth predetermined delivery status message to the second contact number associated with the second recipient of the second pending delivery and that corresponds to the second hardware notification button, said fourth predetermined delivery status message comprising a notification that the second pending delivery is at the second delivery location associated with the second recipient.

5. The non-transitory computer readable medium of claim 1, wherein said program further comprises sets of instructions for:
- receiving selection of a first hardware transmission key input to transmit the first predetermined delivery status message to the contact number associated with the recipient; and
- after transmitting the first predetermined delivery status message, receiving selection of a second hardware transmission key input to transmit the second predetermined delivery status message to the contact number associated with the recipient.

6. A non-transitory computer readable medium storing a program which, when executed by at least one processing unit of a portable notification computing device, uses predetermined delivery status messages to inform a recipient of a pending delivery, said program comprising sets of instructions for:
- receiving a set of recipient contact data associated with a recipient of a pending delivery;
- setting a correspondence between the received set of recipient contact data and a hardware selection button of the portable notification computing device;
- receiving a first hardware button event notification indicating that the hardware selection button of the portable notification computing device is depressed;
- retrieving the set of recipient contact data corresponding to the hardware selection button and associated with the recipient of the pending delivery;
- receiving a second hardware button event notification identifying a selection of a first hardware notification button of the portable notification computing device;
- using the set of recipient contact data to transmit a first predetermined delivery status message to the recipient of the pending delivery, said first predetermined delivery status message comprising a first notification that the pending delivery is en route to a delivery ocation associated with the recipient;
- receiving a third hardware button event notification identifying a selection of a second hardware notification button of the portable notification computing device; and
- using the set of recipient contact data to transmit a second predetermined delivery status message to the recipient of the pending delivery, said second predetermined delivery status message comprising a second notification that the pending deliver is at the delivery location associated with the recipient.

7. The non-transitory computer readable medium of claim 6, wherein the set of recipient contact data comprises a plurality of numbers associated with a telephone number of the recipient.

8. The non-transitory computer readable medium of claim 7, wherein the plurality of numbers are received as a sequence of number key inputs corresponding to a sequence of hardware number key selections on a keypad of the portable notification computing device.

9. The non-transitory computer readable medium of claim 7, wherein the plurality of numbers are decoded from a scan of an encoded delivery symbol associated with the pending delivery.

10. The non-transitory computer readable medium of claim 6, wherein the set of recipient contact data comprises a plurality of alpha-numeric characters associated with an email address of the recipient.

11. The no transitory computer readable medium of claim 6, wherein the hardware selection button is a first hardware selection button in a plurality of hardware selection buttons of the portable notification computing device.

12. The non-transitory computer readable medium of claim 11, wherein a second hardware selection button in the plurality of hardware selection buttons corresponds to a set of contact data associated with a different recipient of a different pending delivery.

* * * * *